United States Patent
Renault et al.

[11] 3,846,538
[45] Nov. 5, 1974

[54] PROCESS FOR REGENERATING STRONG BASES FROM SOLUTIONS OF THEIR SULFIDES AND SIMULTANEOUSLY PRODUCING SULFUR

[75] Inventors: Philippe Renault, Noisy-le-Roi; Claude Dezael, Maisons-Laffitte; Andre Deschamps, Chatou, all of France

[73] Assignee: Institut Francais du Petrole, des Carburants et Lubrifiants, Rueil-Malmaison, France

[22] Filed: Sept. 19, 1972

[21] Appl. No.: 290,406

[30] Foreign Application Priority Data
Sept. 27, 1971 France .................... 71.34749

[52] U.S. Cl. ............ 423/183, 423/234, 423/356, 423/471, 423/545, 423/575
[51] Int. Cl. .... C01b 1/04, C01b 17/04, C01b 17/02
[58] Field of Search ......... 423/183, 222, 575, 561, 423/356, 234

[56] References Cited
UNITED STATES PATENTS

| | | | |
|---|---|---|---|
| 2,106,734 | 2/1938 | Gollmar | 423/234 |
| 3,441,379 | 4/1969 | Renault | 423/575 |
| 3,561,925 | 2/1971 | Deschamps et al. | 423/356 |
| 3,649,190 | 3/1972 | Deschamps et al. | 423/356 |
| 3,672,837 | 6/1972 | Urban | 423/234 |

Primary Examiner—Oscar R. Vertiz
Assistant Examiner—Brian E. Hearn
Attorney, Agent, or Firm—Millen, Raptes & White

[57] ABSTRACT

Process for regenerating a strong base from an aqueous solution of a sulfide thereof comprising (a) contacting said sulfide with an ammonium salt of a strong inorganic acid or an organic acid of low volatility, so as to obtain an aqueous solution of the resulting salt, at such a temperature that hydrogen sulfide and ammonia evolve, (b) contacting said hydrogen sulfide and ammonia with sulfurous anhydride for recovering sulfur and releasing ammonia and water in a gaseous state, (c) contacting said salt with an anionic ion exchange resin so as to release the strong base and to enrich the resin with acid, (d) periodically regenerating the resin with an aqueous solution of ammonia from stage (b) and (e) feeding back to stage (a) the product obtained when regenerating the resin, which consists of a solution of the ammonium salt of the acid.

15 Claims, 1 Drawing Figure

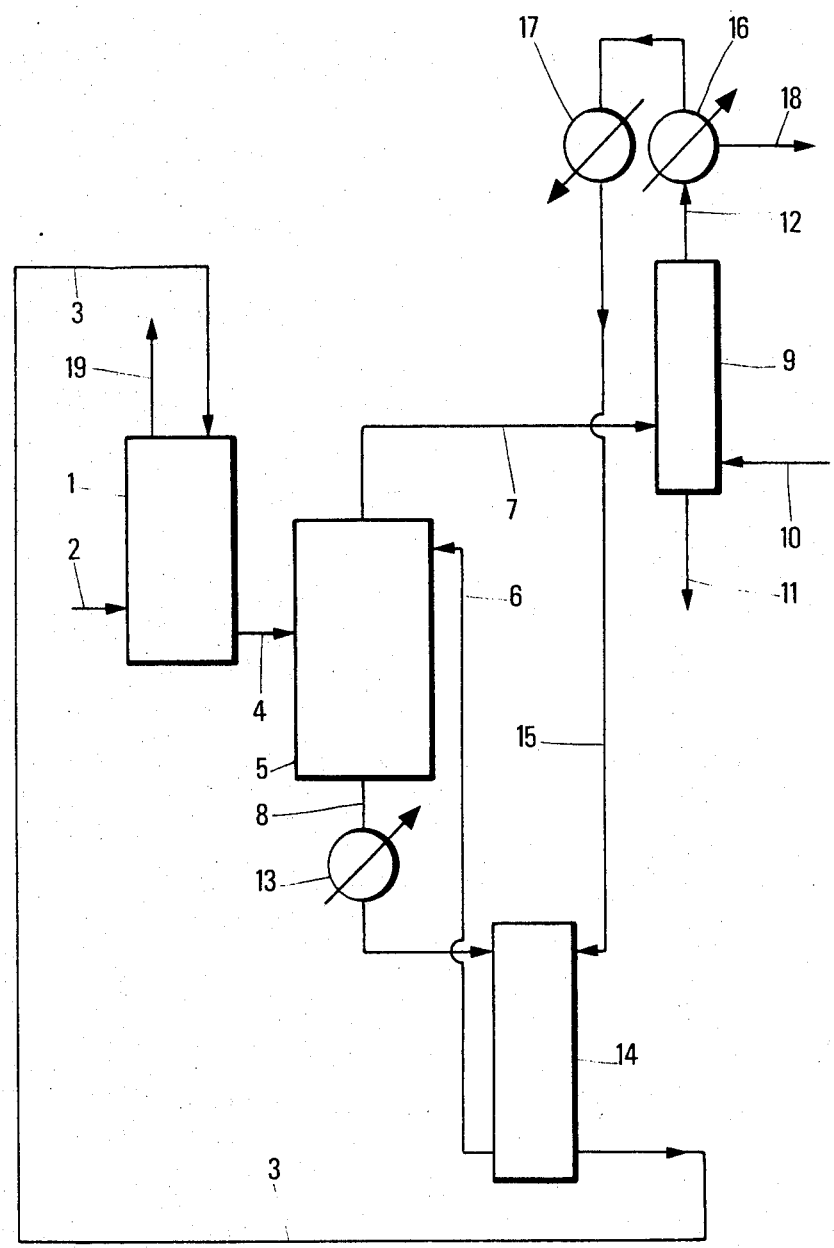

PROCESS FOR REGENERATING STRONG BASES FROM SOLUTIONS OF THEIR SULFIDES AND SIMULTANEOUSLY PRODUCING SULFUR

The removal of the hydrogen sulfide from the gases containing the same in a diluted state is generally effected by washing with an aqueous solution of a basic compound. The alkanolamines have been the most currently used for this operation since their sulfides may be thermally decomposed while regenerating the amine.

The aqueous solutions of strong alkaline bases such as sodium or potassium hydroxides are adapted for a more efficient removal of the hydrogen sulfide but the regeneration of the obtained solutions cannot be achieved by mere heating as it is the case for the amines.

The present invention concerns a process for regenerating the strong bases such as sodium hydroxide or potassium hydroxide from the aqueous solutions of sodium or potassium sulfides with the transformation of the hydrogen sulfide to elemental sulfur.

According to the invention, the aqueous solution of the sodium or potassium sulfide is treated, in a first stage, at such a temperature that the hydrogen sulfide and the ammonia evolve, by means of an ammonium salt of a strong inorganic acid, or of an organic acid less volatile than hydrogen sulfide, preferably in aqueous solution.

In these conditions, hydrogen sulfide and gaseous ammonia evolve and the aqueous solution contains the sodium or potassium salt of the strong acid or of the organic acid.

The gaseous flow containing hydrogen sulfide and ammonia is treated in a second stage so as to produce elemental sulfur and to recover free ammonia. Moreover, during a third stage, the strong base is regenerated from its salt with a strong acid or an organic acid of low volatility, by contacting the solution of this salt with an anionic ion exchange resin. The released ammonia is used, in a second stage, during the conversion of $H_2S$ to sulfur, in the gaseous form or as an aqueous solution for regenerating the ion exchange resin when the latter has been sufficiently enriched with acid. The ammonium salt of the inorganic strong acid or the organic acid is used for displacing $H_2S$ from sodium or potassium sulfide solutions.

For carrying out the process, the aqueous solution of alkali metal sulfide, issued for example from a zone of contact of a hydrogen sulfide containing industrial gas with a strong base, is contacted with an aqueous solution of the ammonium salt of a strong inorganic acid or of an organic acid of low volatility. The temperature in the contact zone may be from 50° to 140°C, and preferably closer to the boiling point of the mixture contained therein. The pressure may be higher or lower than the atmospheric pressure and for example, from 0.2 to 3 atmospheres; however, the operation will be preferably conducted under a pressure close to the atmospheric one.

As strong bases, there will be used sodium or potassium hydroxides; the concentration of the absorbing solution used for removing $H_2S$ from the industrial gas, will be generally from 0.1 to 8 M, and preferably from 0.5 M to 2 M.

Still more diluted solutions (0.05 M and even less) are also convenient.

The ammonium salts which can be used are mainly: $NH_4Cl$, $(NH_4)_2SO_4$, $NH_4$, $NO_3$ and, more generally, all the ammonium salts of strong inorganic acids as well as the ammonium salts of organic acids of low volatility, having a pK lower than 5. There will be mentioned among the latter, for example, the ammonium salts of acetic acid, citric acid, benzoic acid and adipic acid.

The organic acids of low volatility are those which contain for example from 2 to 20 carbon atoms per molecule.

When sodium hydroxide is used as strong base for absorbing $H_2S$ and ammonium chloride is used as salt, the reaction is as follows:

$$Na_2S + 2\ NH_4Cl \rightarrow 2\ NaCl + H_2S + 2\ NH_3$$

The aqueous solutions of ammonium salts are at concentrations of for example from 0.5 to 5 moles per liter and are preferably used so as to conform with the stoichiometry of the reaction. It is however possible to proceed with values different from the preferred ones, for example from 0.05 mole/liter up to saturation.

In order to favour the evolution of the gases, there can be used a scavenging inert gas, for example nitrogen, steam or industrial fumes.

The hydrogen sulfide and the ammonia issuing from the reactor in a gaseous state are treated by sulfurous anhydride so as to convert the sulfur compounds to elemental sulfur.

The ammonia remains unchanged.

The reaction conforms with the following scheme:

$$2\ H_2S + SO_2 \rightarrow 3\ S + H_2O$$

It is however possible to replace $H_2S$ and $NH_3$ by their combination (ammonium sulfide) and $SO_2$ by ammonium sulfite.

The sulfurous anhydride may be used in a pure state or diluted in an inert gas, preferably in such an amount as to conform with the stoichiometry of the reaction.

The reaction of $H_2S$ with $SO_2$ may be performed according to the conventional Claus process but it is preferred to proceed in the presence of an organic liquid phase containing from 10 to 100 percent of a compound selected from heavy alcohols having for example from 8 to 20 carbon atoms per molecule, polyols, mono- and polyalkylene glycols and their ethers and esters, or phosphoric esters of the formula $PO\ (OR)_3$ (R = hydrocarbon monovalent radicals having preferably from 1 to 20 carbon atoms). Other reaction media may be used, for example, melted sulfur. The temperature is preferably at least 90°C and may be for example, from 100° to 180°C according to the type of liquid phase used. In the range from 20° to 90°C, the reaction proceeds more slowly, which is less advantageous. It is possible to proceed under a pressure lower or higher than the atmospheric one. The produced sulfur is removed and the ammonia and water are discharged preferably in the gaseous form.

The aqueous solution of the salt of the acid with the strong base, obtained as another product from the first stage of the process, is brought, after cooling, into contact with a solid or liquid anionic resin, at a temperature from, for example, 0° to 90°C. As examples of anionic resins there will be mentioned the resins of the polyamine type, for example the products known under the trade marks of Amberlite IR 45, IR 4B, IRA 93, Duolite AR 20, AR 10 and A 114, Dowex 3, Dowex 4, Dewatit M, Permutit W, Deacidite IHP, Dowex 1, IRA 400, Duolite A 40, Amberlite LA 1, Amberlite LA 2 and Amberlite LA 3.

By liquid resin, there is meant an amine or polyamine of low volatility, for example of a molecular weight higher than 120, such as n-dodecylamine, bis (1-isobutyl-3,5-dimethylhexyl) amine, di-octyl amine, N-methyl, N,N-dioctyl-amine, tri-octylamine, tribenzylamine and N,N-diisobutyl, N-decylamine.

There is recovered, as product of the first stage, an aqueous solution of the strong base initially used, which may be reused as an asorbing solution for $H_2S$ contained in the treated gases, either as such or after dilution or concentration.

The resin retains the acid and it is necessary to periodically discontinue the contact between the resin and the treated solution coming from the first stage contactor. The regeneration of the resin is carried out by means of the aqueous ammonia solution issuing, after cooling, from the reactor for the conversion of $SO_2$ and $H_2S$ to sulfur.

This solution has preferably a relatively high concentration of $NH_3$; for example its normality will be from 2 N to saturation, preferably from 5 N to 15 N. The temperature during the regeneration is for example from 0° to 90°C, preferably from 30° to 60°C. When a liquid resin is used, it is also possible to make use of ammonia in a gaseous state.

The following non limitative example, and the accompanying drawing, illustrate the invention.

In a reactor 1, there is treated a residual refinery gas containing hydrogen sulfide, by means of an aqueous solution containing 2 moles per liter of sodium hydroxide. The gas and the sodium hydroxide are respectively introduced through pipes 2 and 3. The gaseous effluent escapes through stack 19.

There is recovered in 4 an aqueous brine containing a mixture of sodium hydrogen and neutral sulfides (about 0.2 mole per liter of Na HS and 0.9 mole per liter of $Na_2S$). This brine is fed to a reactor 5 in which it is contacted with ammonium chloride in aqueous solution, which is introduced through pipe 6. This solution has a concentration of 2.6 moles/liter and is used in a proportion of 0.77 liter per liter of sulfide solution to be treated. The products in the reactor 5 are brought to boiling and the pressure is 1.2 atmosphere. The formed hydrogen sulfide and ammonia escape through stack 7 and there is recovered in 8 a sodium chloride solution at a concentration close to 2 moles per liter.

Hydrogen sulfide and ammonia are introduced into the reactor 9 containing polyethyleneglycol of an average molecular weight of 400, and in which sulfurous anhydride is introduced, through pipe 10, in a proportion of 1 mole of $SO_2$ per 2 moles of $H_2S$.

The temperature is about 140°C. The produced sulfur flows through the pipe 11 and the ammonia and steam are discharged through pipe 12.

The effluent recovered from the bottom of reactor 5 through pipe 8 is a solution of sodium chloride at a concentration of about 2 moles per liter. It is cooled down in 13 so that its temperature be about 40°C when it is introduced into column 14 containing a resin DOWEX 3X-8,20-50 mesh. The chloride ion is retained by the resin and the solution flowing from the bottom of column 14 is a sodium hydroxide solution at a concentration of about 2 M, which is fed, through pipe 3, to the hydrogen sulfide absorption zone.

After one hour of operation, the solution issuing from the reactor 5, is fed to a second column of regenerated resin identical to 14 (not shown on the drawing). During this time, the regeneration of the resin from column 14 is performed by conveying through pipe 15 the ammonia issuing from reactor 9, after concentration up to about 6 M in a concentration unit 16, and after cooling in 17. The excess water is removed in 18. The pipe 15 is associated with an ammonia storage unit, not shown, it being understood that, as long as the resin operates as a chloride ion acceptor, the communication between the ammonia storage unit and the column 14 is discontinued.

At the outlet of the resin column, there is recovered an effluent containing ammonia and ammonium chloride at a concentration of 2.6 moles/liter which is fed to reactor 5, through pipe 6. When the resin of the column has been regenerated, the column may be put again into service.

Equivalent results are obtaineed when the ammonium chloride solution is replaced by an equal volume of 1.3 M ammonium neutral sulfate solution.

The resin column has also been replaced by an extractor containing a solution of dilaurylamine in xylene. The results obtained are equivalent.

What we claim as this invention is:

1. A process for regenerating a strong base from an aqueous solution of a corresponding sulfide of said strong base, wherein (a) the aqueous solution of said sulfide is contacted with an ammonium salt of a strong inorganic acid or an organic acid less volatile than hydrogen sulfide, at such a temperature that hydrogen sulfide and ammonia evolve, so as to obtain an aqueous solution of the salt of the acid and the strong base; (b) the hydrogen sulfide and the ammonia obtained in the stage (a) are contacted with sulfurous anhydride for recovering sulfur and releasing, in a gaseous state, ammonia and water; (c) the solution of the salt of the acid and the strong base produced in the stage (a) is contacted with an anionic ion exchange resin in order to release the strong base and to enrich the resin with acid; (c) the contact with the resin is periodically interrupted and the latter is treated with an aqueous solution of ammonia issuing from stage (b), so as to regenerate the resin which, after regeneration, is contacted with the solution of the salt formed by the acid and the strong base; and (e) the product obtained when regenerating the resin, which consists of an aqueous solution of the ammonium salt of the acid, is fed back to stage (a).

2. A process according to claim 1, wherein the sulfide is sodium or potassium sulfide.

3. A process according to claim 1 wherein the ammonium salt used for displacing the hydrogen sulfide from the sulfide solution is an ammonium salt of strong inorganic acid.

4. A process according to claim 3 wherein the ammonium salt is ammonium chloride or ammonium sulfate.

5. A process according to claim 4, wherein the sulfide is sodium or potassium sulfide.

6. A process according to claim 1, wherein the ammonium salt used for displacing the hydrogen sulfide from the strong base sulfide solution is a salt of an organic acid of 2-20 carbon atoms whose pK value is lower than 5.

7. A process according to claim 6, wherein the ammonium salt is selected from the group consisting of the ammonium salts of acetic acid, citric acid, benzoic acid and adipic acid.

8. A process according to claim 1, wherein the aqueous solution of said sulfide results from contacting a hydrogen sulfide containing gas with an aqueous solution of a strong base.

9. A process according to claim 8 wherein the aqueous solution of a strong base has a concentration of from 0.1 to 8 moles/liter.

10. A process according to claim 8 wherein the aqueous solution of a strong base has a concentration from 0.5 to 2 moles/liter.

11. A process according to claim 1, wherein the aqueous solution of ammonium salt has a concentration of 0.5 to 5 moles/liter.

12. A process according to claim 1, wherein the stage (b) is carried out in a liquid phase containing a heavy alcohol, a polyol, a mono- or polyalkylene glycol or an ether or ester of these compounds.

13. A process according to claim 1, wherein the aqueous ammonia solution has a concentration from 2 N up to saturation.

14. A process according to claim 5, wherein the anionic exchange resin is a polyamine.

15. A processs according to claim 14, wherein step (a) is conducted at a temperature of at least 90°C.

* * * * *